(12) United States Patent
Kikuchi et al.

(10) Patent No.: US 8,150,254 B2
(45) Date of Patent: Apr. 3, 2012

(54) IMAGE PICKUP SYSTEM HAVING RANGING FUNCTION

(75) Inventors: Takayuki Kikuchi, Utsunomiya (JP); Shingo Isobe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 66 days.

(21) Appl. No.: 12/861,498

(22) Filed: Aug. 23, 2010

(65) Prior Publication Data
US 2011/0044676 A1  Feb. 24, 2011

(30) Foreign Application Priority Data
Aug. 24, 2009 (JP) .................. 2009-192707

(51) Int. Cl.
G03B 15/16 (2006.01)

(52) U.S. Cl. .......................... 396/95; 382/107

(58) Field of Classification Search ............ 396/95, 396/121; 382/106–107
See application file for complete search history.

(56) References Cited

U.S. PATENT DOCUMENTS

| | | | |
|---|---|---|---|
| 5,189,459 A * | 2/1993 | Watanabe et al. | 396/95 |
| 5,264,893 A * | 11/1993 | Nonaka | 396/104 |
| 5,574,535 A * | 11/1996 | Ogasawara | 396/95 |
| 5,664,237 A * | 9/1997 | Watanabe | 396/96 |
| 6,061,001 A * | 5/2000 | Sugimoto | 340/903 |
| 6,768,867 B2 * | 7/2004 | Kindaichi et al. | 396/100 |
| 2005/0083435 A1 * | 4/2005 | Itoh et al. | 348/441 |
| 2006/0034489 A1 * | 2/2006 | McClanahan | 382/107 |
| 2008/0042894 A1 * | 2/2008 | Kikuchi | 342/71 |

FOREIGN PATENT DOCUMENTS

| | | |
|---|---|---|
| JP | 5-027321 A | 2/1993 |
| JP | 2003-149256 A | 5/2003 |
| JP | 2007-192730 A | 8/2007 |

OTHER PUBLICATIONS

Machine Vision by Ramesh Jain, Rangachar Kasturi, Brian G Schunck Published by McGraw-Hill ISBN 0-07-032018-7, 1995 pp. 406-458.*

* cited by examiner

Primary Examiner — Christopher Mahoney
(74) Attorney, Agent, or Firm — Rossi, Kimms & McDowell LLP

(57) ABSTRACT

The image pickup system includes a ranging part measuring object distances in plural ranging areas in an image pickup region in a state where the image pickup system and a moving object are in movement with respect to a still object, a first setting part setting, among the plural ranging areas, a first ranging area including the moving object, a second setting part setting, among the plural ranging areas, a second ranging area including the still object. The system further includes a calculating part calculating a moving speed of the moving object based on the object distances measured in the first and second ranging areas by the ranging part at a first time point and the object distances measured in the first and second ranging areas by the ranging part at a second time point different from the first time point.

9 Claims, 9 Drawing Sheets

TIME POINT t1

TIME POINT t2

IMAGE PICKUP SYSTEM HAVING RANGING FUNCTION

BACKGROUND OF THE INVENTION

1. Field of the Invention

The present invention relates to an image pickup system having a ranging (distance measuring) function, and particularly to an image pickup system suitable for a live telecast of marathon or the like.

2. Description of the Related Art

In a telecast of marathon, measurement of runners' speeds and display thereof are required. Japanese Patent Laid-Open Nos. 5-27321 and 2007-192730 have disclosed image pickup systems that measure a moving speed of a moving object by using a ranging function which detects an object distance. Japanese Patent Laid-Open No. 2003-149256 has disclosed an image pickup system that measures a running speed of a first vehicle by using information on a running speed of a second vehicle equipped with the image pickup system and captured images of the first vehicle obtained at mutually different time points.

However, calculation of an accurate speed of the moving object in a state where the image pickup system is in movement requires detection of an absolute speed (ground speed) of the image pickup system. Further, it is necessary to calculate the absolute speed from a relative speed of the image pickup system and the moving object, the relative speed being obtained by the ranging function equipped on the image pickup system. The image pickup systems disclosed in Japanese Patent Laid-Open Nos. 5-27321 and 2007-192730 can calculate the relative speed, but cannot calculate the absolute speed.

Moreover, the image pickup system disclosed in Japanese Patent Laid-Open No. 2003-149256 needs to obtain the information on the running speed of the second vehicle equipped with the image pickup system. Thus, for example, in a telecast of marathon, absolute speeds of runners are calculated using information on the running speed of the second vehicle equipped with the image pickup system and ranging information (object distance information) obtained by the image pickup system. However, such a calculation method of the absolute speed enlarges the image pickup system.

SUMMARY OF THE INVENTION

The present invention provides an image pickup system capable of capturing an image of a moving object while moving, and calculating a moving speed of the moving object with a simple system configuration.

The present invention provides as an aspect thereof an image pickup system including a lens apparatus and a camera that captures images through the lens apparatus in a state where the image pickup system and a moving object are in movement with respect to a still object. The image pickup system includes a ranging part configured to measure object distances in plural ranging areas provided in an image pickup region of the image pickup system, a first setting part configured to set a first ranging area including the moving object among the plural ranging areas, a second setting part configured to set a second ranging area including the still object among the plural ranging areas, and a calculating part configured to calculate a moving speed of the moving object based on the object distances measured in the first and second ranging areas by the ranging part at a first time point and the object distances measured in the first and second ranging areas by the ranging part at a second time point different from the first time point.

The present invention provides as another aspect thereof a lens apparatus being included in an image pickup system including a camera that captures images trough the lens apparatus in a state where the image pickup system and a moving object are in movement with respect to a still object, the image pickup system setting, among plural ranging areas provided in an image pickup region of the image pickup system, a first ranging area including a moving object and a second ranging area including a still object. The lens apparatus includes a ranging part configured to measure object distances in the plural ranging areas in a state where the image pickup system and the moving object are moving with respect to the still object, and a calculating part configured to calculate a moving speed of the moving object based on the object distances measured in the first and second ranging areas by the ranging part at a first time point and the object distances measured in the first and second ranging areas by the ranging part at a second time point different from the first time point.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

[Embodiment 1]

Figure 1:
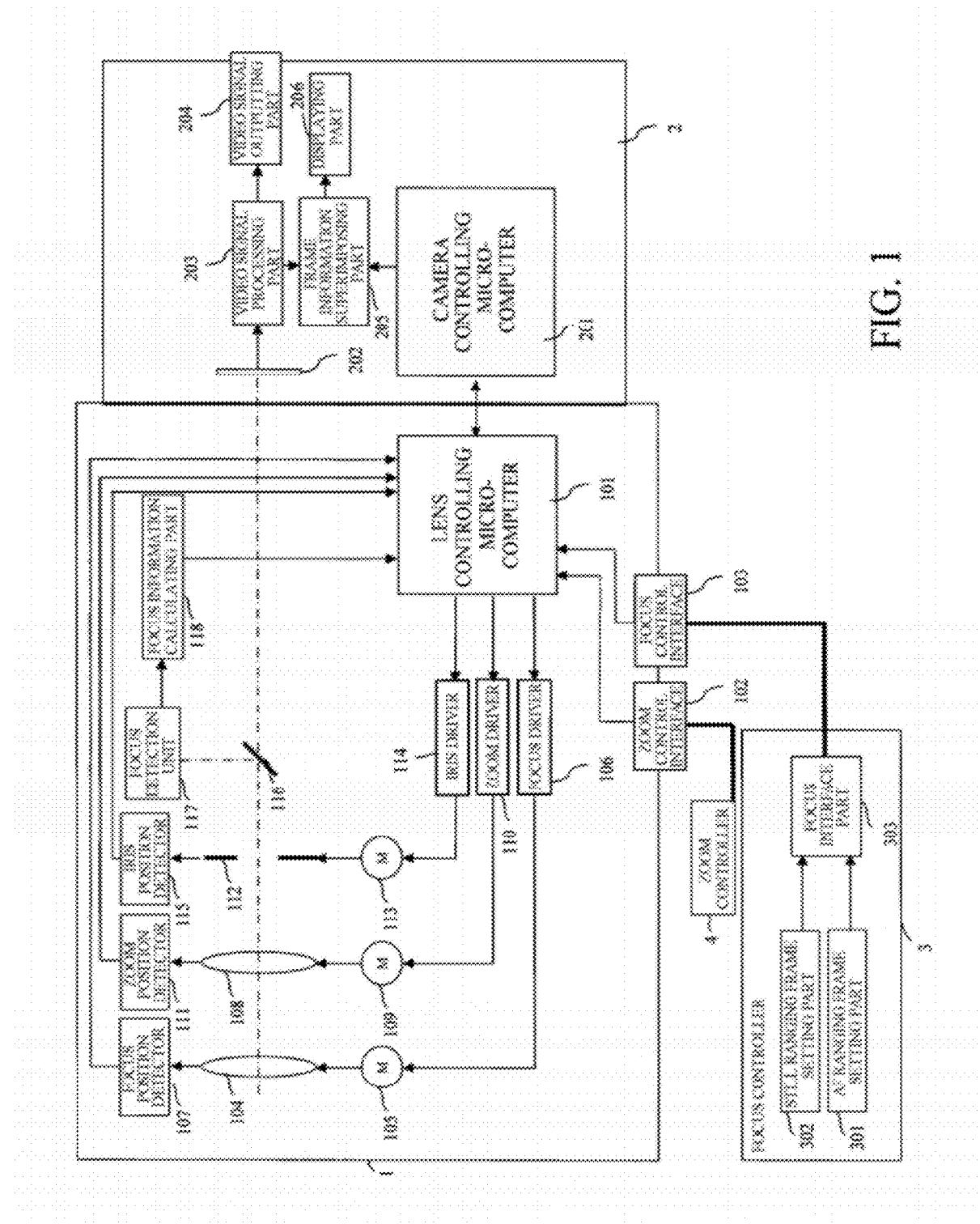
FIG. 1 is a block diagram showing a configuration of an image pickup system that is Embodiment 1 of the present invention.

FIG. 1 shows a configuration of an image pickup system that is a first embodiment (Embodiment 1) of the present invention. In FIG. 1, reference numeral denotes a lens apparatus, and reference numeral 2 denotes a camera. Reference numeral 3 denotes a focus controller (also referred to as a "focus demand") as a focus operating device that is operated by a user for causing the lens apparatus 1 to perform focusing. Reference numeral 4 denotes a zoom controller (also referred to as a "zoom demand") as a zoom operating device that is operated by the user for causing the lens apparatus 1 to perform zooming.

The lens apparatus 1 is configured as follows. Reference numeral 101 denotes a lens controlling microcomputer that controls various operations of the lens apparatus 1. Reference numeral 102 denotes a zoom control interface (IF_A) into which an operation signal from the zoom controller 4 is input. Reference numeral 103 denotes a focus control interface (IF_B) into which an operation signal from the focus controller 3 is input.

Reference numeral 104 denotes a focus lens, and reference numeral 105 denotes a focus motor that moves the focus lens 104 in an optical axis direction. Reference numeral 106 denotes a focus driver that drives the focus motor 105. Reference numeral 107 denotes a focus position detector that detects a position of the focus lens 104 in the optical axis direction.

Reference numeral 108 denotes a zoom lens, and reference numeral 109 denotes a zoom motor that moves the zoom lens 108 in the optical axis direction. Reference numeral 110 denotes a zoom driver that drives the zoom motor 109. Reference numeral 111 denotes a zoom position detector that detects a position of the zoom lens 108 in the optical axis direction.

Reference numeral 112 denotes an iris (aperture stop), and reference numeral 113 denotes an iris motor that operates the iris 112. Reference numeral 114 denotes an iris driver that drives the iris motor 113. Reference numeral 115 denotes an iris position detector that detects an operation position of the iris 112 in an opening and closing direction. The focus lens 104, the zoom lens 108, the iris 112 and other lenses (not shown) constitute an image taking optical system.

Reference numeral 116 denotes a separating optical system that separates a part of a light flux that has passed through the focus lens 104, the zoom lens 108 and iris 112. Reference numeral 117 denotes a focus detection unit into which a partial light flux that has been separated (reflected) by the separating optical system 116 enters. The focus detection unit 117 detects a focus state (defocus amount) of the image taking optical system for an object included in each of plural focus detection areas (hereinafter referred to as "ranging areas") provided in an image pickup region (hereinafter referred to as an "image pickup frame") by a phase difference detection method to output a signal showing a phase difference corresponding to the focus state. Reference numeral 118 denotes a focus information calculating part that calculates the defocus amount of the image taking optical system in each ranging area based on the phase difference detected in that ranging area shown by the signal output from the focus detection unit 117, and outputs information on the defocus amount to the lens controlling microcomputer 101.

In the camera 2, reference numeral 201 denotes a camera controlling microcomputer that controls various operations of the camera 2 and communicates with the lens controlling microcomputer 101. Reference numeral 202 denotes an image pickup element such as a CCD sensor or a CMOS sensor that photoelectrically converts an object image formed by another partial light flux which has passed through the separating optical system 116 provided in the lens apparatus 1. The image pickup element 202 is hereinafter referred to as the "CCD 202".

Reference numeral 203 denotes a video signal processing part that performs various processing on an image pickup signal output from the CCD 202 to generate a video signal. Reference numeral 204 denotes a video signal outputting part that outputs the video signal generated by the video signal processing part 203 to an outside of the camera 2.

Reference numeral 205 denotes a frame information superimposing part that superimposes ranging frames input from the lens apparatus 1 through the camera controlling microcomputer 201 on the video signal generated by the video signal processing part 203, and adds position information of each of the ranging frames to the video signal. The ranging frame is a display frame that surrounds the ranging area set by the focus detection unit 117. Reference numeral 206 denotes a displaying part such as a viewfinder that displays the video signal on which the ranging frames are superimposed by the frame information superimposing part 205. In the following description, the ranging area and the ranging frame surrounding it are collectively called the "ranging frame".

In the focus controller 3, reference numeral 301 denotes an AF ranging frame setting part that sets, according to a user's selection operation, an AF ranging frame (first ranging area) which is an in-focus target ranging frame where auto focus (AF) is performed among the plural ranging frames. Reference numeral 302 denotes a still ranging frame setting part that sets (specifies), according to a user's selection operation, a still ranging frame (second ranging area) which is a ranging frame including a still object among the ranging frames. The AF ranging frame setting part 301 and the still ranging frame setting part 302 respectively output setting information of the AF ranging frame (hereinafter referred to as "AF ranging frame setting information") and setting information of the still ranging frame (hereinafter referred to as "still ranging frame setting information") according to the user's selection operations.

Reference numeral 303 denotes a focus interface part that converts the AF ranging frame setting information from the AF ranging frame setting part 301 and the still ranging frame setting information from the still ranging frame setting part 302 into signals of a predetermined transmission format to output them to the lens apparatus 1. The lens controlling microcomputer 101 sets in the image pickup frame the AF ranging frame and the still ranging frame at positions corresponding to the AF ranging frame setting information and the still ranging frame setting information, respectively. The AF ranging frame setting part 301 and the lens controlling microcomputer 101 constitute a first setting part. The still ranging frame setting part 302 and the lens controlling microcomputer 101 constitute a second setting part.

The focus controller 3 is provided with a manual focus operating part (not shown) through which the user manually adjusts the focus state.

The light flux that has entered the image taking optical system of the lens apparatus 1 from the object reaches the separating optical system 116 to be separated into the partial light flux reflected thereby and the other partial light flux transmitted therethrough. The light flux transmitted through the separating optical system 116 forms an object image on the CCD 202. The light flux reflected by the separating optical system 116 enters the focus detection unit 117 that is disposed at a position conjugate with respect to the CCD 202 in the lens apparatus 1.

Figure 2:
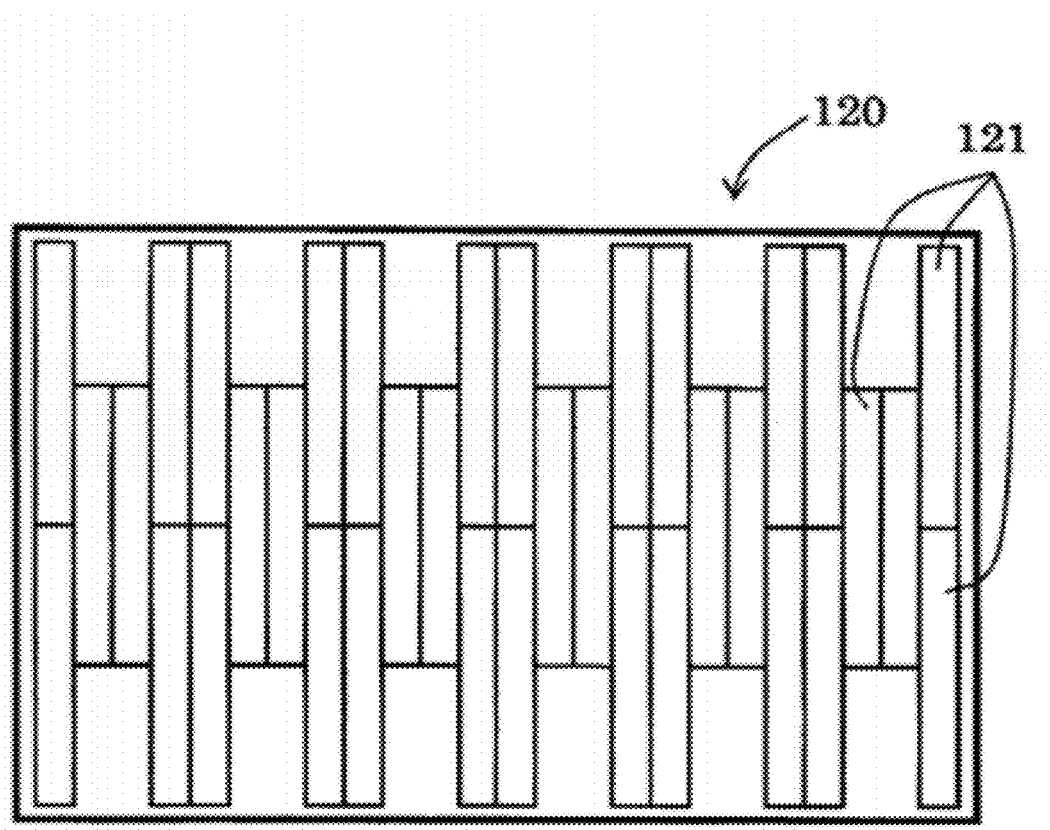
FIG. 2 shows an example of AF sensor arrangement in Embodiment 1.

The focus detection unit 117 includes plural paired secondary image-forming lenses (not shown) provided so as to correspond to the plural ranging frames, and a phase difference sensor 120 shown in FIG. 2. The phase difference sensor 120 is provided with plural paired line sensors (photoelectric conversion element arrays) respectively corresponding to the plural ranging frames.

Of the light flux reflected by the separating optical system 116, each light flux corresponding to each ranging frame is further divided into two by the paired secondary image-forming lenses provided for that ranging frame. The two divided light fluxes form two object images (hereinafter referred to as "two images") on the paired line sensors 121 corresponding to that ranging frame. The paired line sensors 121 photoelectrically convert these two images to output two image signals. The two image signals have the phase difference corresponding to the focus state of the image taking optical system for the object included in that ranging frame.

When the image taking system is in an in-focus state, the phase difference corresponding to an interval (distance) of the two images indicates a specific value. When the image taking system is in a front focus state, the phase difference is smaller than the specific value. Moreover, when the image taking system is in a rear focus state, the phase difference is larger than the specific value. Thus, the focus detection unit 117 (AF sensor 120) has a function of detecting the phase difference between the two images formed by the light fluxes that have entered the lens apparatus 1.

The two image signals from the paired line sensors 121 are input to the focus detection calculating part 118. The focus detection calculating part 118 performs correlation calculation on the two image signals to calculate the phase difference between the two image signals, and further calculates the defocus amount of the image taking optical system on the basis of the phase difference. Thus, plural defocus amounts corresponding to the plural paired line sensors 121 provided in the AF sensor 120 are calculated. The calculated plural defocus amounts are input to the lens controlling microcomputer 101.

The lens controlling microcomputer 101 calculates a moving amount (including a moving direction) of the focus lens 104 to obtain the in-focus state of the image taking optical system for the object included in the AF ranging frame on the basis of the defocus amount calculated in the AF ranging frame. Then, the lens controlling microcomputer 101 moves the focus lens 104 by the calculated moving amount (that is, performs focus control), which enables acquisition of the in-focus state for the object included in the AF ranging frame. The lens controlling microcomputer 101 corresponds to a focus controlling part.

Moreover, the lens controlling microcomputer 101 calculates a distance (object distance) to the object included in each ranging frame on the basis of the defocus amount calculated in that ranging frame, the position of the focus lens 104 and the position of the zoom lens 108. The focus detection unit 117, the focus detection calculating part 118 and the lens controlling microcomputer 101 constitute a ranging part.

Furthermore, the lens controlling microcomputer 101 serves as a calculating part that calculates a difference between the object distance in the AF ranging frame (hereinafter referred to as the "AF ranging frame object distance") and the object distance in the still ranging frame (hereinafter referred to as the "still ranging frame object distance") which are calculated (obtained) at a first time point, and a difference between the AF ranging frame object distance and the still ranging frame object distance which are calculated (obtained) at a second time point different from the first time point. The difference between the AF ranging frame object distance and the still ranging frame object distance are hereinafter referred to as the "AF-still object distance difference". Then, the lens controlling microcomputer 101 calculates a moving speed of the moving object included in the AF ranging frame based on a change amount of the AF-still object distance difference in a time period from the first time point to the second time point.

In other words, the lens controlling microcomputer 101 calculates the moving speed of the moving object on the basis of a change amount of the AF-still object distance difference measured at the second time point with respect to the AF-still object distance difference measured at the first time point.

Next, description will be made of processing performed by the lens controlling microcomputer 101 with reference to a flowchart shown in FIG. 3. This processing is performed according to a computer program stored in the lens controlling microcomputer 101. The description herein will be made of a case where the image pickup system is in movement by being mounted on a vehicle or the like, the image pickup frame includes a moving object moving with the image pickup system and a still object, and image capturing of the moving object is performed while focusing on the moving object by AF.

At step S301, the lens controlling microcomputer 101 starts the processing in response to power-on of the lens apparatus 1, and then proceeds to step S304. The lens controlling microcomputer 101 repeats the processing until the power is turned off (steps S302 and S303).

At step S304, the lens controlling microcomputer 101 sets the AF ranging frame according to the AF ranging frame setting information from the AF ranging frame setting part 301 provided in the focus controller 3.

At step S305, the lens controlling microcomputer 101 sends the position information of the set AF ranging frame to the camera controlling microcomputer 201. The camera controlling microcomputer 201 causes the frame information superimposing part 205 to superimpose the AF ranging frame on the video signal generated in the video signal processing part 203 according to the position information of the set AF ranging frame. Thus, the video signal including the AF ranging frame is displayed on the displaying part 206.

Next at step S306, the lens controlling microcomputer 101 obtains the information on the defocus amounts (hereinafter also referred to as "defocus information") in each of the plural ranging frames obtained from the focus information calculating part 118. Then at steps S307 and S308, the lens controlling microcomputer 101 obtains the information on the position of the focus lens 104 and the information on the position of the zoom lens 108 (hereinafter respectively referred to as "focus position information" and "zoom position information") obtained from the focus and zoom position detectors 107 and 111.

Next at step S309, the lens controlling microcomputer 101 calculates the object distance in each of the ranging frames on the basis of the defocus information, the focus position information and the zoom position information.

Further at step S310, the lens controlling microcomputer 101 calculates a target driving amount of the focus lens 104 to obtain an in-focus state on the basis of the defocus amount information in the AF ranging frame, and then moves the focus lens 104 by the target driving amount through the focus driver 106.

Next at step S311, the lens controlling microcomputer 101 determines whether or not the still ranging frame setting information has been input from the still ranging frame setting part 302 provided in the focus controller 3. The lens controlling microcomputer 101 returns to step S302 if the still ranging frame setting information has not been input, and proceeds to step S312 if the still ranging frame setting information has been input.

At step S312, the lens controlling microcomputer 101 sets the still ranging frame according to the still ranging frame setting information. And, at step S313, the lens controlling microcomputer 101 sends the position information of the set still ranging frame to the camera controlling microcomputer 201. The camera controlling microcomputer 201 causes the frame information superimposing part 205 to superimpose the still ranging frame on the video signal generated in the video signal processing part 203 according to the position information of the set still ranging frame. Thus, the video signal including the still ranging frame is displayed on the displaying part 206.

Next at step S314, the lens controlling microcomputer 101 calculates the difference between the still ranging frame object distance and the AF ranging frame object distance (that is, the AF-still object distance difference) to obtain a relative distance between the still object included in the still ranging frame and the moving object included in the AF ranging frame.

Then at step S315, the lens controlling microcomputer 101 calculates a change amount with time of the relative distance (hereafter referred to as a "time change amount of the relative distance") calculated at step S314. In other words, the lens controlling microcomputer 101 calculates a difference of the relative distances calculated at two mutually different time points. Thus, an absolute speed (or a ground speed) that is an actual moving speed of the moving object included in the AF ranging frame can be acquired.

At step S316, the lens controlling microcomputer 101 outputs information on the absolute speed acquired at step S315 to an outside of the lens apparatus 1. The information on the absolute speed is superimposed on the video signal and displayed on the displaying unit 206 in the camera 2, and sent to an external apparatus (not shown). Thereafter, the lens controlling microcomputer 101 returns to step S302 to repeat the processing.

Figure 4:
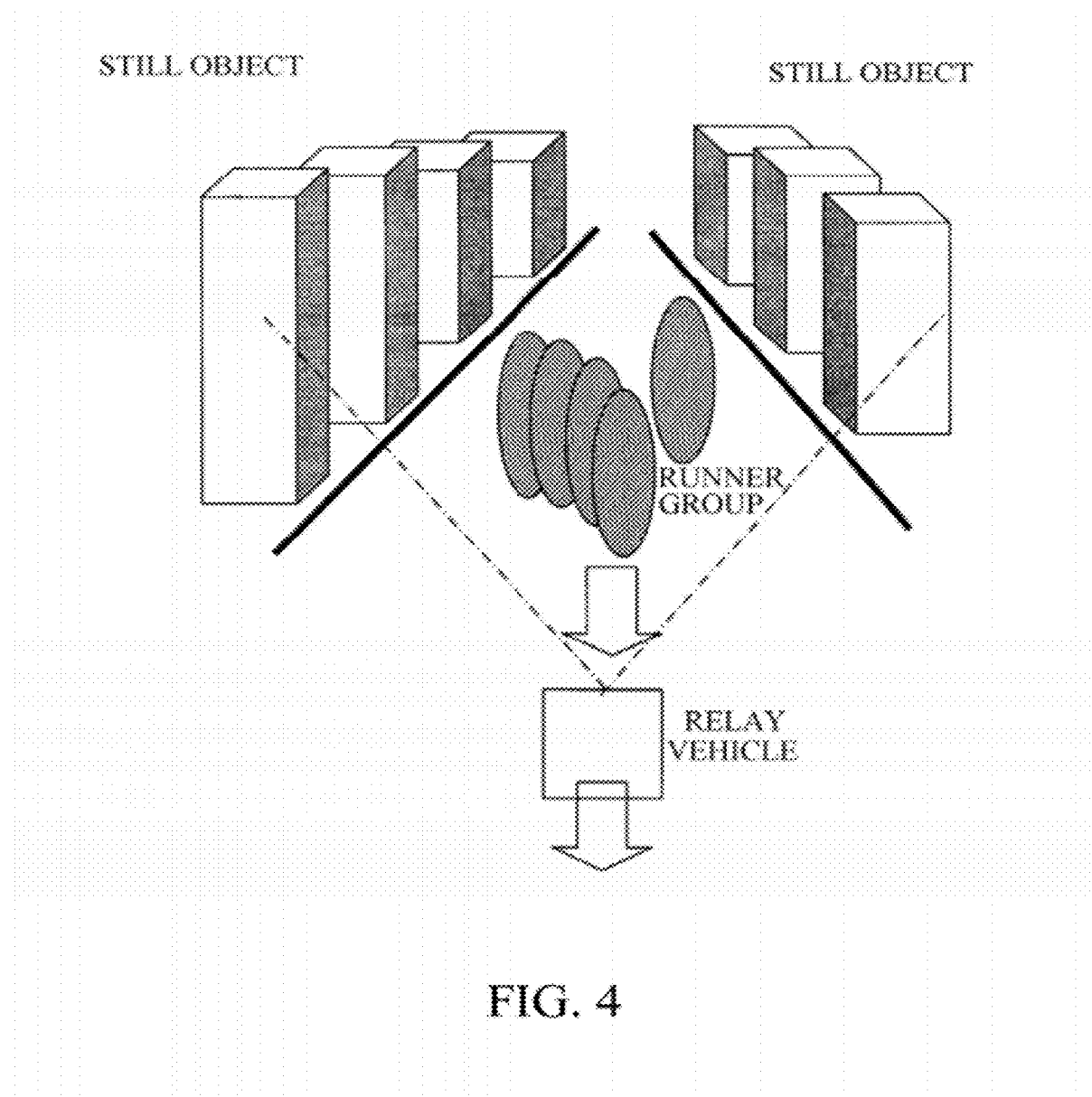
FIG. 4 shows an example in which the image pickup system of Embodiment 1 is used for a live telecast of marathon.
Figures 5A, 5B:
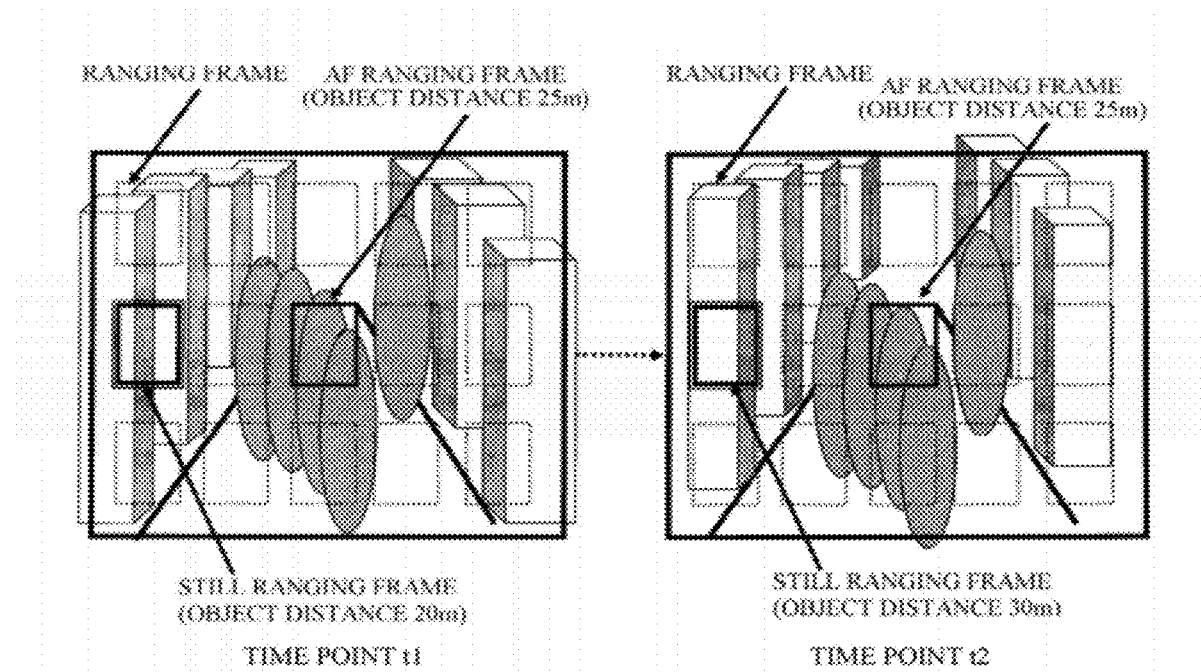
FIG. 5 shows an example of display on a displaying part when the image pickup system of Embodiment 1 is used for the live telecast of marathon.

Description will be made of an example of using the image pickup system of this embodiment with reference to FIGS. 4, 5A and 5B. FIG. 4 shows an example scene in which the image pickup system is used in a live telecast of marathon. The image pickup system mounted on a relay vehicle is capturing an image (video) of a runner group while the relay vehicle is running ahead of the runner group in a same direction as that of the runner group at an approximately same speed as that thereof. FIGS. 5A and 5B show the image pickup frame corresponding to the above-described scene. FIG. 5A shows the image pickup frame at a time point t1, and FIG. 5B shows the image pickup frame at a time point t2 after the time point t1.

The user (camera operator) selects the AF ranging frame through the AF ranging frame setting part 301 in the focus controller 3. The AF ranging frame including a runner running at a center of the image pickup frame is selected in FIGS. 5A and 5B.

Thereafter, the user operates the still ranging frame setting part 302 if needed.

Figure 6:
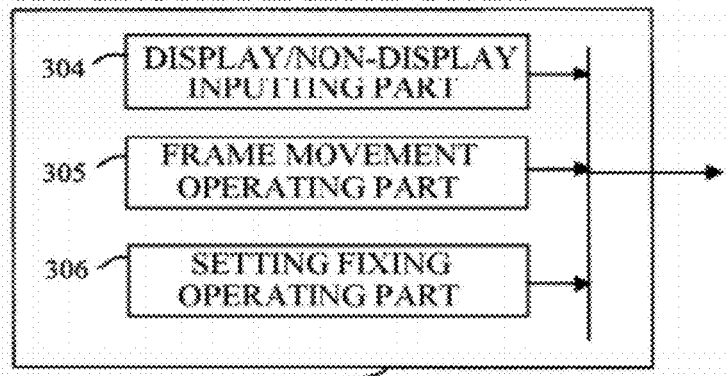
FIG. 6 shows a configuration of a still ranging frame operating part in Embodiment 1.

FIG. 6 shows an example of a configuration of the still ranging frame setting part 302. The user operates a display/non-display inputting part 304 to cause the displaying part 206 in the camera 2 to display the still ranging frame. Next, the user operates a frame movement operating part 305 to move the still ranging frame such that the still ranging frame includes a still object, and then performs a fixing operation of a setting fixing operating part 306 to fix the still object image. FIG. 5A shows a state where this series of operations has been performed.

The lens controlling microcomputer 101 calculates the AF-still object distance difference (relative distance) at each of the time point t1 (first time point) and the time point t2 (second time point) different from each other. Then, the lens controlling microcomputer 101 calculates the time change amount of the relative distance from the time point t1 to the time point t2, thereby obtaining the absolute speed of the moving object included in the AF ranging frame. This absolute speed calculation processing is repeated after the still ranging frame has been fixed by the operation of the setting fixing operating part 306 until the fixing of the still ranging frame is canceled.

The absolute speed calculation processing may be ended in response to a non-display operation of the display/non-display inputting part 304 for deleting the still ranging frame, or in response to an operation of the frame movement operating part 305 or the AF ranging frame setting part 301 for moving the still ranging frame or the AF ranging frame.

Moreover, a zooming operation varies an image pickup field angle, which changes the object included in each ranging frame. Therefore, a ranging target object in the set still ranging frame is also changed. In this case, the absolute speed calculation processing may be stopped to forcibly delete the display of the still ranging frame, or the still ranging frame may be automatically moved by an amount corresponding to a change amount of the image pickup field angle when a wide-angle zooming operation is performed.

In addition, in a case where a change amount with time of the object distance (hereinafter referred to as a "time change amount of the object distance") calculated in the set still ranging frame is larger than a predetermined value, the absolute speed calculation processing may be stopped to forcibly delete the display of the still ranging frame.

As described above, this embodiment can calculate and display, even when the image pickup system itself is in movement, the absolute speed of the moving object while capturing the image of the moving object that is an AF target object. Further, the calculation of the absolute speed of the moving object does not need speed information of the relay vehicle, which can prevent complication and enlargement of the image pickup system.

In this embodiment, although the description has been made of the case where the still ranging frame setting part 302 is provided in the focus controller 3, the still ranging frame setting part may be provided in a remote controlling part in a case where the lens apparatus and the camera are remotely operated from a position separate therefrom. Moreover, in a so-called portable image pickup system that can perform image capturing on a user's shoulder, the still ranging frame setting part may be provided in a drive unit attached to the lens apparatus or in the camera.

[Embodiment 2]

Next, description will be made of a second embodiment (Embodiment 2) of the present invention. In this embodiment, still ranging frame candidates decided by calculating object distances in respective ranging frames are displayed in a displaying part 206, and a user selects (sets) a still ranging frame based on this display.

Processing performed by a lens controlling microcomputer 101 in this embodiment will be described with reference to a flowchart shown in FIG. 7. A configuration of an image pickup system (including a lens apparatus 1 and a camera 2) of this embodiment is the same as that of Embodiment 1, and therefore components common to those in Embodiment 1 are denoted by the same reference numerals as those in Embodiment 1. Descriptions of steps S301 to S310 in FIG. 7 at which the same processes are performed as those performed at steps S301 to S310 in FIG. 3 are omitted.

Figure 7:
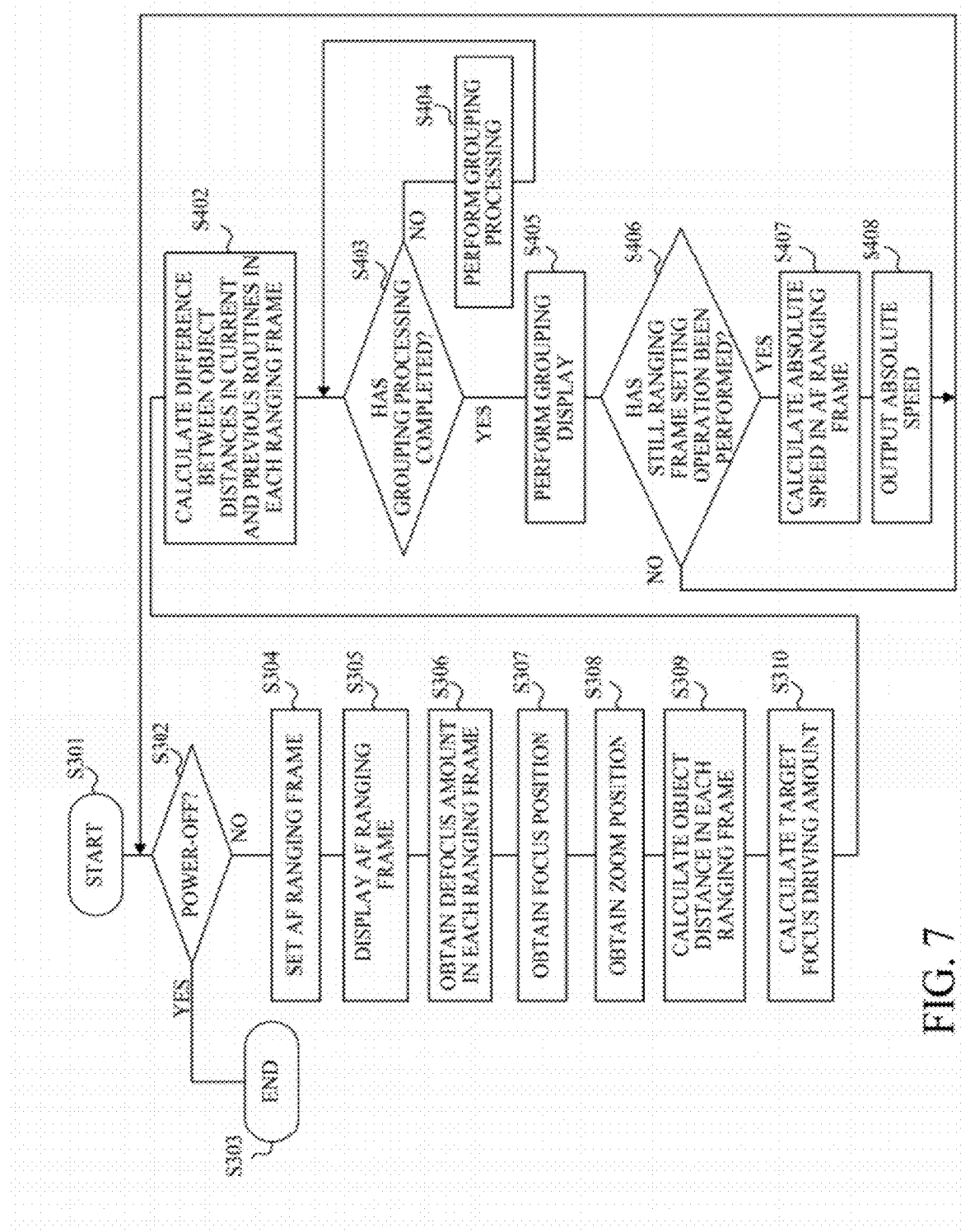
FIG. 7 is a flowchart showing processing performed in an image pickup system that is Embodiment 2 of the present invention.

In FIG. 7, after finishing AF processing at step S310, the lens controlling microcomputer 101 calculates at step S402, in each of all ranging frames, a difference between an object distance obtained at step S309 in a current routine and an object distance obtained at the same step in a previous routine. That is, the lens controlling microcomputer 101 calculates in each ranging frame a time change amount of the object distance that is the difference of the object distances obtained at mutually different time points.

Then at step S403, the lens controlling microcomputer 101 determines whether or not grouping processing being performed in next step S404 has completed for the all ranging frames. The lens controlling microcomputer 101 proceeds to step S404 if the grouping processing for the all ranging frames has not yet completed, and proceeds to step S405 if the grouping processing for the all ranging frames has completed.

At step S404, the lens controlling microcomputer 101 performs the grouping processing (classifying processing) grouping two or more ranging frames that the time change amounts of the object distance calculated at step S403 are close to each other, in other words, that the time change amounts of the object distance are included in an approximately equal range (predetermined range). Then, the lens controlling microcomputer 101 returns to step S403.

At step S405, the lens controlling microcomputer 101 sends a grouping display signal to a camera controlling microcomputer 201. The camera controlling microcomputer 201 performs, according to the grouping display signal, grouping display on the displaying part 206 which shows the two or more ranging frames grouped at step S404 are included in a same group.

Figure 8A:
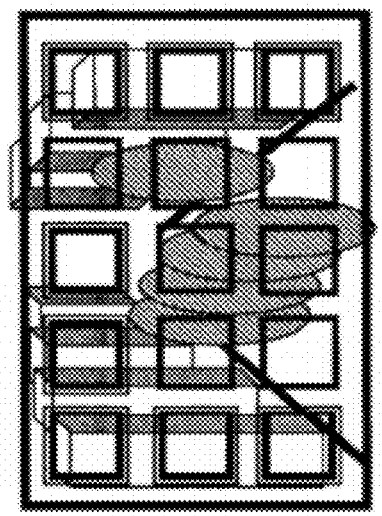
FIG. 8 shows an example of display on a displaying part when the image pickup system of Embodiment 2 is used for the live telecast of marathon.
Figure 8B:
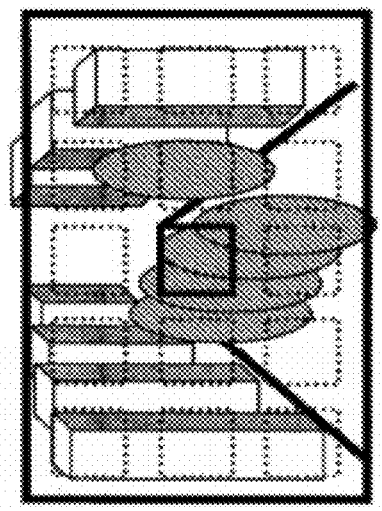
Figure 8C:
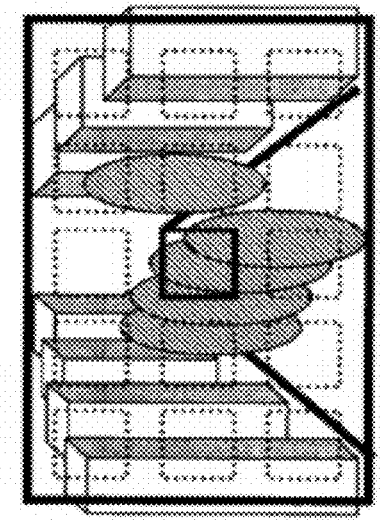

For example, FIGS. 8A and 8B show image pickup frames (upper figures) and object distances obtained in the respective ranging frames (lower figures) at time points t1 and t2, respectively. FIG. 8C shows differences between the object distances obtained in the respective ranging frames at the time points t1 and t2 (that is, the time change amounts of the object distance). FIG. 8C shows that a group including seven ranging frames where the time change amount of the object distance is "0" (hereinafter referred to as a group of "0") and a group including eight ranging frames where the time change amount of the object distance is "5" (hereinafter referred to as a group of "5") are generated. In this example, the above-mentioned approximately equal range is set to "1".

The group of "0" is a group that includes the ranging frames including moving objects that are in movement with the image pickup system. On the other hand, the group of "5" is a group that includes the ranging frames including still objects.

The displaying part 206 performs the grouping display for showing these two groups. In FIG. 8C, a single frame is used for displaying the group of "0", and a double frame is used for displaying the group of The AF ranging frame is displayed with a frame different from those of the other ranging frames so as to be able to be distinguished from the other ranging frames. The grouping display may be performed with frames having different line numbers as described above, different line thicknesses or different line colors.

The eight ranging frames included in the group of "5" are the still ranging frame candidates among which the still ranging frame can be selected through a selection operation, that is, an operation of the frame movement operating part 305 shown in FIG. 6. A user operates the frame movement operating part 305 to select one still ranging frame among the still ranging frame candidates, and then operates a setting fixing operating part 306 to fix the still ranging frame.

Next at step S406, the lens controlling microcomputer 101 determines whether or not the above-mentioned setting operation of the still ranging frame has been performed. The lens controlling microcomputer 101 proceeds to step S407 if the setting operation has been performed, and proceeds to step S302 if the setting operation has not been yet performed.

Figure 3:
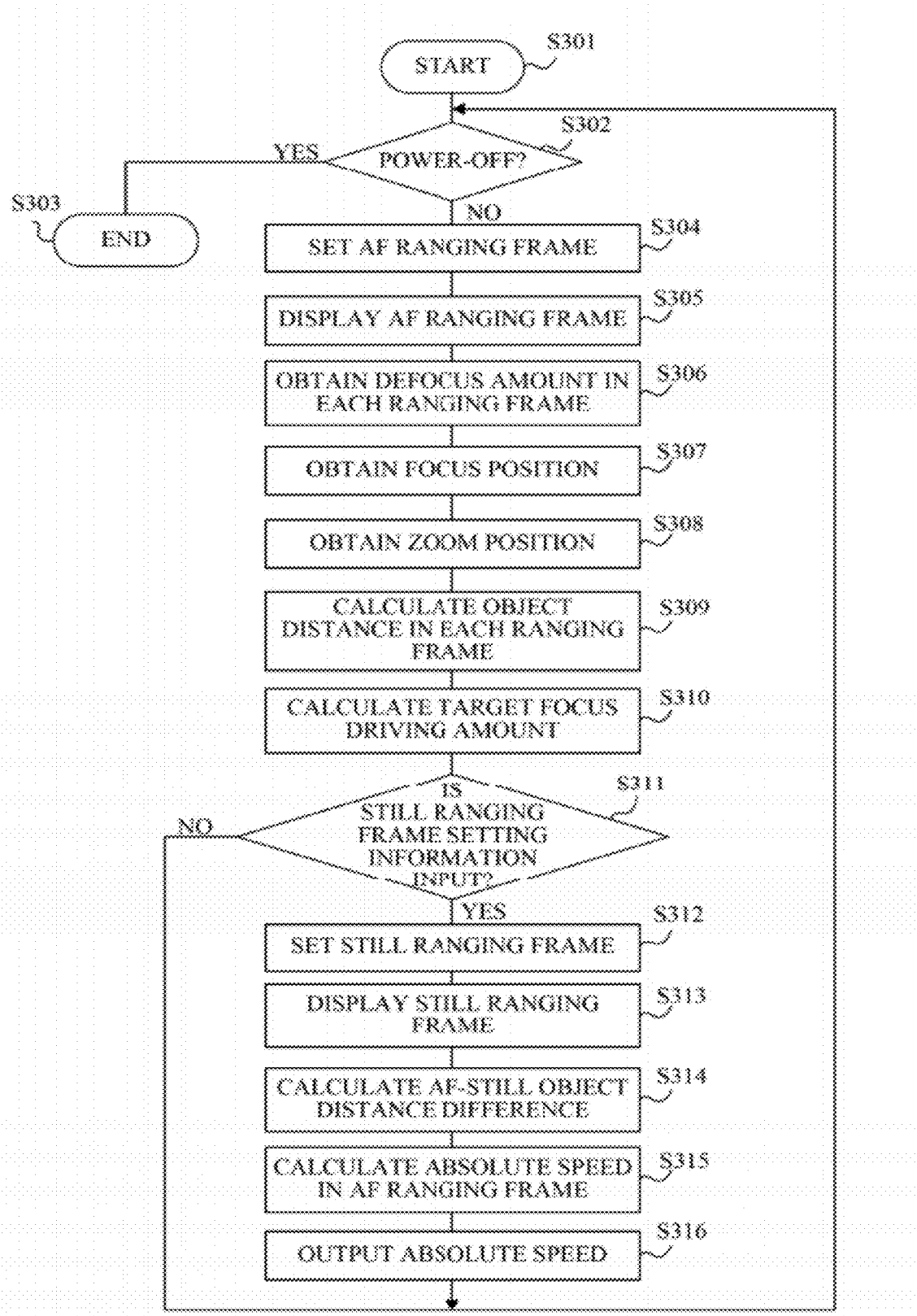
FIG. 3 is a flowchart showing processing performed in the image pickup system of Embodiment 1.

At step S407, the lens controlling microcomputer 101 calculates an absolute speed of the moving object included in the AF ranging frame by the processing described at steps S314 and S315 in FIG. 3.

Then at step S408, the lens controlling microcomputer 101 outputs information on the absolute speed calculated at step S407 to an outside of the lens apparatus 1. The information on the absolute speed is superimposed on a video signal in the camera 2 to be displayed in the displaying part 206, and sent to an external apparatus (not shown). Thereafter, the lens controlling microcomputer 101 returns to step S302 to repeat the processing.

This embodiment displays the group of the selectable still ranging frame candidates, which can make the user's selection operation for selecting the still ranging frame easy.

Although this embodiment has described the case where the ranging frames are always displayed and the absolute speed calculation processing is continuously repeated, the absolute speed calculation processing may be performed when the operation of the display/non-display inputting part 304 shown in FIG. 6 for selecting "display" is performed. That is, the processes at steps S401 to S409 shown in FIG. 7 may be performed when the "display" is selected without being performed when "non-display" is selected.

Moreover, although this embodiment has described the case where the user finally selects the still ranging frame, the lens controlling microcomputer 101 may automatically set the still ranging frame on the basis of the time change amount of the object distance (that is, the object distance difference measured at two mutually different time points) to display the still ranging frame on the displaying part 206. For example, the lens controlling microcomputer 101 may automatically set a ranging frame where the time change amount of the object distance is larger than a predetermined value (for example, "2") as the still ranging frame.

Furthermore, although this embodiment has described by using FIG. 8 the case where there are only the group whose time change amount of the object distance is "0" and the group whose time change amount of the object distance is "5" which is the still ranging frame candidate group, there are many actual cases where plural groups whose time change amounts of the object distance are different from "0" and "5", such as "10", "3" and "−8", are mixed. In such cases, among the plural groups, one group including the most numbers of the ranging frames may be set as the still ranging frame group.

In this case, since the group (ranging frame group) including the AF ranging frame captures the moving object in movement at an approximately same speed as that of the image pickup system, the group including the AF ranging frame may be excluded from the still ranging frame candidate group. In addition, since the still objects go rearward in the image pickup frame in FIGS. 4, 5A and 5B, the still ranging frame candidate group may be determined among the groups whose time change amount of the object distance is positive.

[Embodiment 3]

Next, description will be made of a third embodiment (Embodiment 3) of the present invention. This embodiment calculates, when a difference between object distances obtained in a still ranging frame that is set by a user at two mutually different time points discontinuously changes, that is, when a still object included in the still ranging frame is no longer a ranging target, an absolute speed of a moving object by using a difference between object distances obtained in another still ranging frame.

Figure 9:
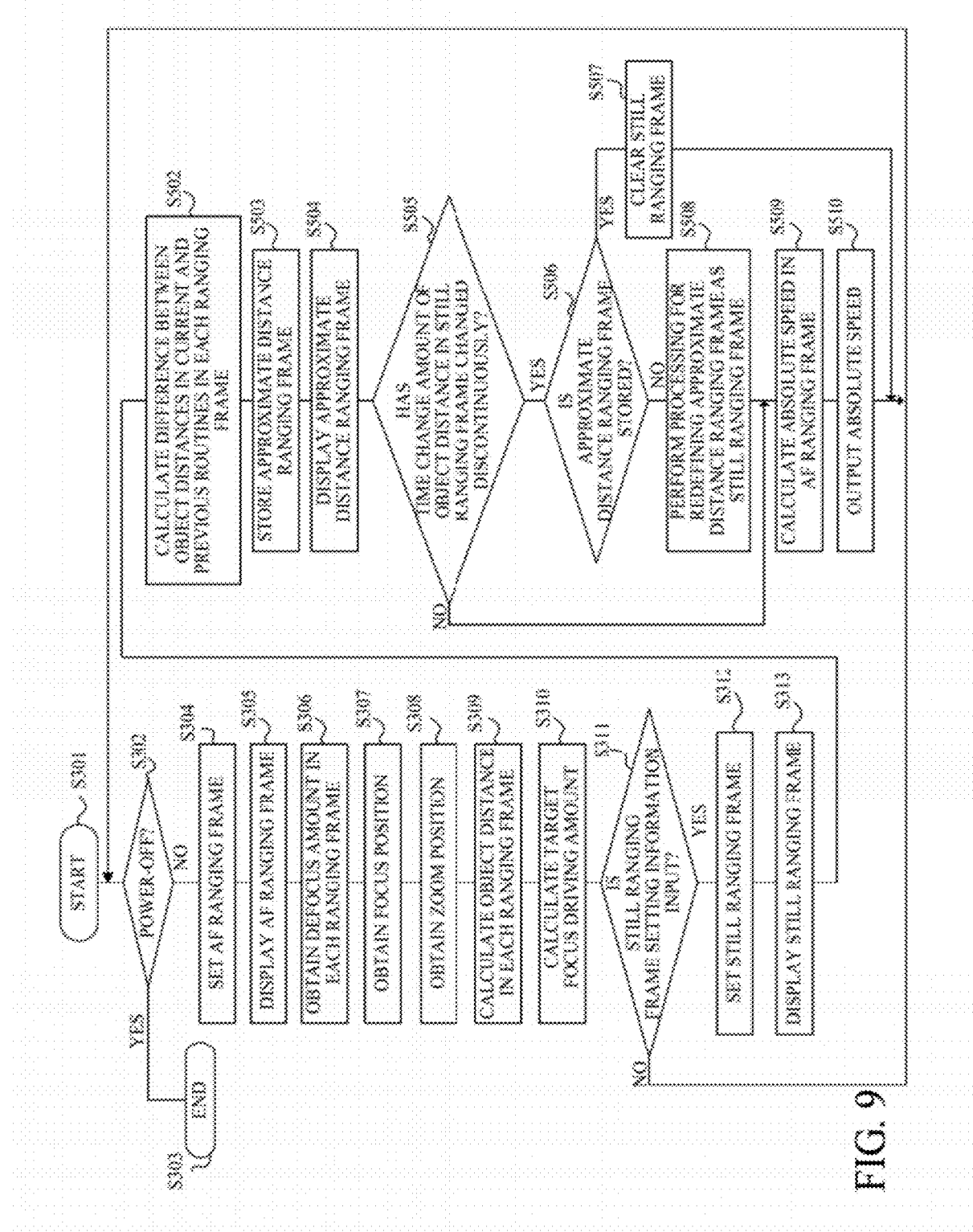
FIG. 9 is a flowchart showing processing performed in an image pickup system that is Embodiment 3 of the present invention.
Figures 10A, 10B:
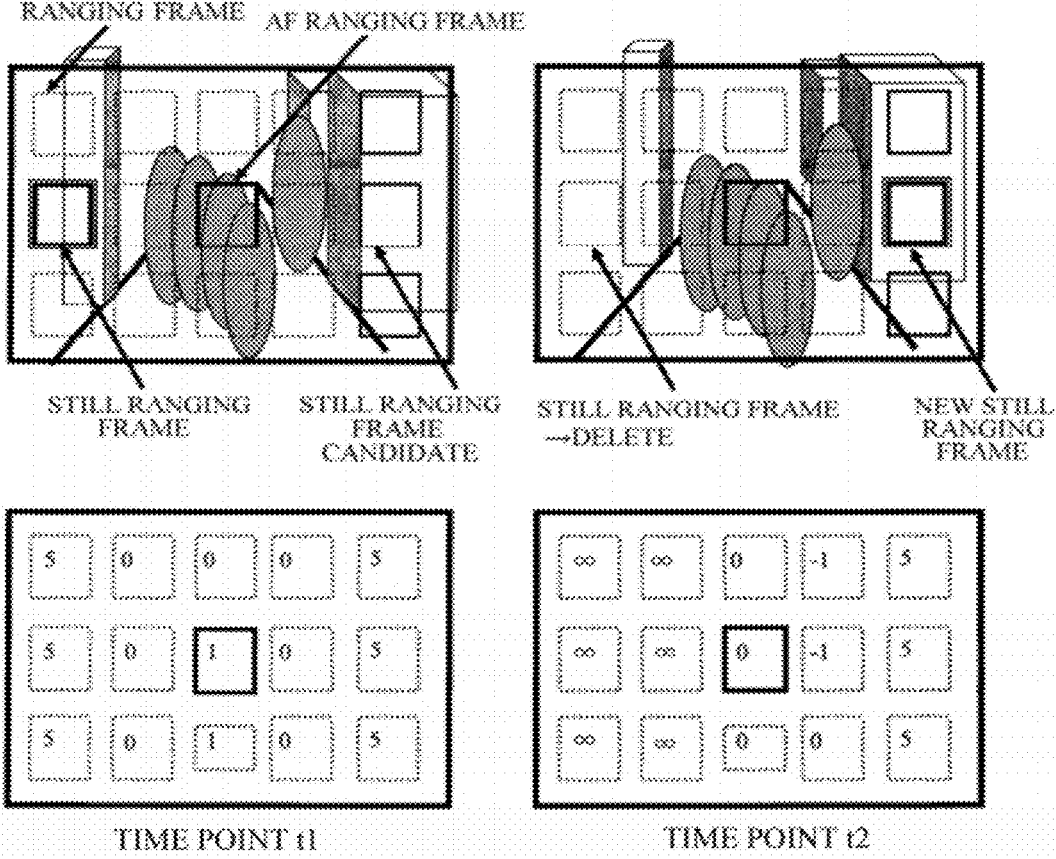
FIG. 10 shows an example of display on a displaying part when the image pickup system of Embodiment 3 is used for the live telecast of marathon.

Processing performed by a lens controlling microcomputer 101 in this embodiment will be described with reference to a flowchart shown in FIG. 9. A configuration of an image pickup system (including a lens apparatus 1 and a camera 2) of this embodiment is the same as that of Embodiment 1, and therefore components common to those in Embodiment 1 are denoted by the same reference numerals as those in Embodiment 1. Descriptions of steps S301 to S313 in FIG. 9 at which the same processes are performed as those performed at steps S301 to S313 in FIG. 3 are omitted. FIGS. 10A and 10B show an example of using the image pickup system of this embodiment.

After setting and displaying still ranging frames at step S313, the lens controlling microcomputer 101 calculates at step S502, in each of all ranging frames, a difference between an object distance obtained at step S309 in a current routine and an object distance obtained at the same step in a previous routine. That is, the lens controlling microcomputer 101 calculates in each ranging frame a time change amount of the object distance that is the difference of the object distances obtained at mutually different time points.

Then at step S503, the lens controlling microcomputer 101 searches for a ranging frame (hereinafter referred to as an "approximate distance ranging frame") where the time change amount of the object distance is equal to or can be regarded as approximate to the time change amount of the object distance in the still ranging frame, and stores the approximate distance ranging frame. The term "equal to or can be regarded as approximate to" can be replaced by a term "within a predetermined range with respect to".

Further at step S504, the lens controlling microcomputer 101 displays the approximate distance ranging frame on a displaying part 206. In FIG. 10A, after a ranging frame located at a vertically center and horizontally left position is set to the still ranging frame by a user, the lens controlling microcomputer 101 displays the above-described approximate distance ranging frames (three right ranging frames) on the displaying part 206 as still ranging frame candidates. It is desirable that the still ranging frame candidates be displayed so as to be clearly distinguished from an AF ranging area and the still ranging frame.

Then at step S505, the lens controlling microcomputer 101 determines whether or not the time change amount of the object distance obtained in the still ranging frame has changed discontinuously. The lens controlling microcomputer 101 proceeds to step S509 if such a discontinuous change has not occurred, and proceeds to step S506 if the discontinuous change has occurred.

At step S509, the lens controlling microcomputer 101 calculates an absolute speed of a moving object included in the AF ranging frame by the processing described at steps S314 and S315 in FIG. 3 in Embodiment 1.

Then at step S510, the lens controlling microcomputer 101 outputs information on the absolute speed calculated at step S509 to an outside of the lens apparatus 1. The information on the absolute speed is superimposed on a video signal to be displayed on the displaying part 206 in the camera 2, and sent to an external apparatus (not shown). Thereafter, the lens controlling microcomputer 101 returns to step S302 to repeat the processing.

On the other hand, at step S506, the lens controlling microcomputer 101 determines whether or not the approximate distance ranging frame is stored. The lens controlling microcomputer 101 proceeds to step S508 if the approximate distance ranging frame is stored, and proceeds to step S507 if the approximate distance ranging frame is not stored.

At step S508, the lens controlling microcomputer 101 performs processing for redefining the approximate distance ranging frame as a new still ranging frame and displays the new still ranging frame. Then, the lens controlling microcomputer 101 calculates at step S509 the absolute speed of the moving object included in the AF ranging frame as described above, and outputs at step S510 the information on the absolute speed to the displaying part 206.

The time change amount of the object distance in the still ranging frame set by the user set is "5" at a time point t1 as shown in FIG. 10A, but it becomes "∞" at a time point t2 as shown in FIG. 10B. This shows that the discontinuous change in the time change amount of the object distance occurs in the still ranging frame. The lens controlling microcomputer 101 sets (redefines), as the new still ranging frame, one ranging frame located at a vertically center and horizontally right position among the three right ranging frames currently stored as the approximate distance ranging frames.

In a case where plural approximate distance ranging frames are stored, it is desirable to set an approximate distance ranging frame that has been stored for a longest time period as a new still ranging frame.

At step S507, the lens controlling microcomputer 101 forcibly clears the still ranging frame set by the user, and returns to step S302.

This embodiment can redefine, even when the object included in the still ranging frame set by the user changes, the still ranging frame to the approximate distance ranging frame that is another still ranging frame candidate, which enables increase of chances for calculation of the absolute speed of the moving object by using the object distance obtained in the still ranging frame and the object distance obtained in the AF ranging frame.

Although each of the above embodiments has described the case where the focus detection unit 117 and the lens controlling microcomputer 101 which constitute a ranging part, a first setting part, a second setting part and a calculating part are provided in the lens apparatus 1, the ranging part, the first and second setting parts and the calculating part may be respectively provided in any of a lens apparatus, a camera and a focus controller which constitute an image pickup system.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims the benefit of Japanese Patent Application No. 2009-192707, filed on Aug. 24, 2009, which is hereby incorporated by reference herein in its entirety.

What is claimed is:

1. An image pickup system including a lens apparatus and a camera that captures images through the lens apparatus in a state where the image pickup system and a moving object are in movement with respect to a still object, the image pickup system comprising:

a ranging part configured to measure object distances in plural ranging areas provided in an image pickup region of the image pickup system;

a first setting part configured to set a first ranging area including the moving object among the plural ranging areas;

a second setting part configured to set a second ranging area including the still object among the plural ranging areas; and a calculating part configured to calculate a moving speed of the moving object based on the object distances measured in the first and second ranging areas by the ranging part at a first time point and the object distances measured in the first and second ranging areas by the ranging part at a second time point different from the first time point.

2. An image pickup system according to claim 1, wherein the calculating part is configured to calculate the moving speed of the moving object based on a difference between the object distances measured in the first and second ranging areas by the ranging part at the first time point and a difference between the object distances measured in the first and second ranging areas by the ranging part at the second time point.

3. An image pickup system according to claim 1, wherein the second setting part is configured to set the second ranging area according to a user's selection operation.

4. An image pickup system according to claim 3, wherein the second setting part is configured to display, among the plural ranging areas, at least one ranging area that is selectable as the second ranging area by the user's selection operation, the selectable ranging area being a ranging area where a difference between the object distances measured by the ranging part at mutually different time points is larger than a predetermined value.

5. An image pickup system according to claim 1, wherein the second setting part is configured to automatically set, among the plural ranging areas, at least one ranging area where a difference between the object distances measured by the ranging part at mutually different time points is larger than a predetermined value.

6. An image pickup system according to claim 1, wherein the calculating part is configured to calculate, when a first difference between the object distances measured in the second ranging area by the ranging part at mutually different time points discontinuously changes, the moving speed of the moving object by using a second difference between the object distances measured in a ranging area other than the second ranging area among the plural ranging areas by the ranging part at the mutually different time points, the second difference being within a predetermined range with respect to the first difference.

7. A lens apparatus being included in an image pickup system including a camera that captures images trough the lens apparatus in a state where the image pickup system and a moving object are in movement with respect to a still object, the image pickup system setting, among plural ranging areas provided in an image pickup region of the image pickup system, a first ranging area including a moving object and a second ranging area including a still object, the lens apparatus comprising:

a ranging part configured to measure object distances in the plural ranging areas; and a calculating part configured to calculate a moving speed of the moving object based on the object distances measured in the first and second ranging areas by the ranging part at a first time point and the object distances measured in the first and second ranging areas by the ranging part at a second time point different from the first time point.

8. An image pickup system according to claim 7, wherein the calculating part is configured to calculate the moving speed of the moving object based on a difference between the object distances measured in the first and second ranging areas by the ranging part at the first time point and a difference between the object distances measured in the first and second ranging areas by the ranging part at the second time point.

9. A lens apparatus according to claim 7, further comprising:

a focus controlling part configured to perform focus control for the moving object included in the first ranging area.

* * * * *